United States Patent [19]

Drayer

[11] Patent Number: 5,325,790
[45] Date of Patent: Jul. 5, 1994

[54] ROLLBACK-PREVENTING APPARATUS FOR A RAIL VEHICLE

[75] Inventor: Hans Drayer, Denzlingen, Fed. Rep. of Germany

[73] Assignee: Heinrich Mack GmbH & Co., Waldkirch, Fed. Rep. of Germany

[21] Appl. No.: 81,100

[22] Filed: Jun. 25, 1993

[30] Foreign Application Priority Data

Jun. 26, 1992 [DE] Fed. Rep. of Germany ....... 4220940

[51] Int. Cl.$^5$ ................................................. B61K 7/00
[52] U.S. Cl. .................................... 104/249; 188/82.1; 188/82.7; 188/82.77; 187/73
[58] Field of Search .......................... 104/53, 250, 251; 105/124, 128; 188/82.1, 82.5, 82.7, 82.77, 82.8, 82.84; 187/73, 77, 78, 80

[56] References Cited

U.S. PATENT DOCUMENTS

| | | | |
|---|---|---|---|
| 4,433,628 | 2/1984 | Wakabayashi | 104/250 X |
| 4,724,771 | 2/1988 | Yamada | 104/56 |
| 4,867,282 | 9/1989 | Hartley | 188/82.1 |
| 5,158,021 | 10/1992 | Matsui et al. | 104/292 |

FOREIGN PATENT DOCUMENTS

| | | |
|---|---|---|
| 861979 | 1/1953 | Fed. Rep. of Germany . |
| 47526 | 10/1988 | Fed. Rep. of Germany . |
| 261634 | 11/1926 | United Kingdom ............ 187/73 |
| 912074 | 12/1962 | United Kingdom .......... 188/82.7 |

Primary Examiner—Robert J. Oberleitner
Assistant Examiner—S. Joseph Morano
Attorney, Agent, or Firm—Mason, Fenwick & Lawrence

[57] ABSTRACT

Rollback-preventing apparatus for a rail vehicle for engaging a toothed rack securely joined to the rail track includes a detent pawl attached to the wheel of the rail vehicle. The detent pawl has a ratchet which is shaped for engagement in the toothed rack. The detent pawl is frictionally engaged with a friction disk that is rotated by the wheel of the rail vehicle. The extent of rotational movement of the detent pawl is limited by a stop. The frictional engagement between the detent pawl and the friction disk raises the ratchet above the toothed rack during travel of the rail vehicle in the normal direction, preventing engagement and noise. If the rail vehicle begins to move backwards, the ratchet of the detent pawl is moved by the frictional engagement of the disk and detent pawl into engagement with the toothed rack and thus prevents the vehicle from rolling backward.

7 Claims, 2 Drawing Sheets 5,325,790

ROLLBACK-PREVENTING APPARATUS FOR A RAIL VEHICLE

FIELD OF THE INVENTION

This invention relates to a rollback-preventing apparatus for a rail vehicle.

BACKGROUND OF THE INVENTION

A large number of rail tracks such as roller coaster tracks, bobsled tracks, wildwater tracks and so on can be found in amusement parks and fair grounds. A common feature of all these tracks is that rail vehicles are not propelled by their own drive system and that they run in a closed course. At the beginning of the closed course, the rail vehicles are pulled up an incline to a certain height. From this height they move without their own drive system, i.e., by gravity, to the end of the course. They are pulled up the incline with a traction chain, for example. Since the incline is usually very steep, the rail vehicle must be immediately prevented from rolling backward in the event of failure of the pulling mechanism. A detent pawl attached to the vehicle and pulled over a toothed rack attached to the bottom of the incline is usually used for this purpose. The detent pawl is raised by one flank of the toothed structure, and after passing the descending flank, drops under gravity into the gaps between the teeth. Loud clattering that can be heard far away is associated with this dropping-back action.

Since show businesses of this type, particularly fair grounds, are erected in the vicinity of residential districts, this noise production is extremely annoying. It is during the night time sleeping periods in particular that residents are subjected to such additional noise production.

This clattering noise is extremely annoying even for the passengers of the rail vehicles.

SUMMARY OF THE INVENTION

The present invention comprises a detent pawl that is frictionally coupled with a friction wheel attached to the rail vehicle. Because of this frictional coupling between detent pawl and friction wheel, the direction of rotation of the friction wheel is transmitted to the detent pawl. The pivoting range of the detent pawl is limited by a stop attached to the vehicle. During movement in the normal travel direction, the detent pawl is raised up to this stop by means of the frictional coupling with the friction wheel. When the detent pawl is in contact with this stop, a sufficient clearance exists between the detent pawl and the toothed rack. Noise produced by beating of the detent pawl on the teeth of the toothed rack is therefore avoided. If the device must be activated, i.e., if the vehicle starts to move backward, the direction of rotation of the friction wheel is reversed. This change in direction of rotation is transmitted by the frictional coupling to the detent pawl, and the detent pawl is turned until it comes into contact with the toothed rack and latches into it. The latched detent pawl then prevents the vehicle from rolling further backward.

An object of the present invention is to provide a rollback-preventing apparatus for rail vehicles, which causes only slight noise production, is functionally safe, operates independently of outside energy, is inexpensive to make, requires little maintenance effort and is universally usable.

BRIEF DESCRIPTION OF THE DRAWINGS

The invention will be understood by reading the following Description of the Preferred Embodiments with reference to the accompanying drawing FIGURES, in which.

DESCRIPTION OF THE PREFERRED EMBODIMENT

Figure 1:
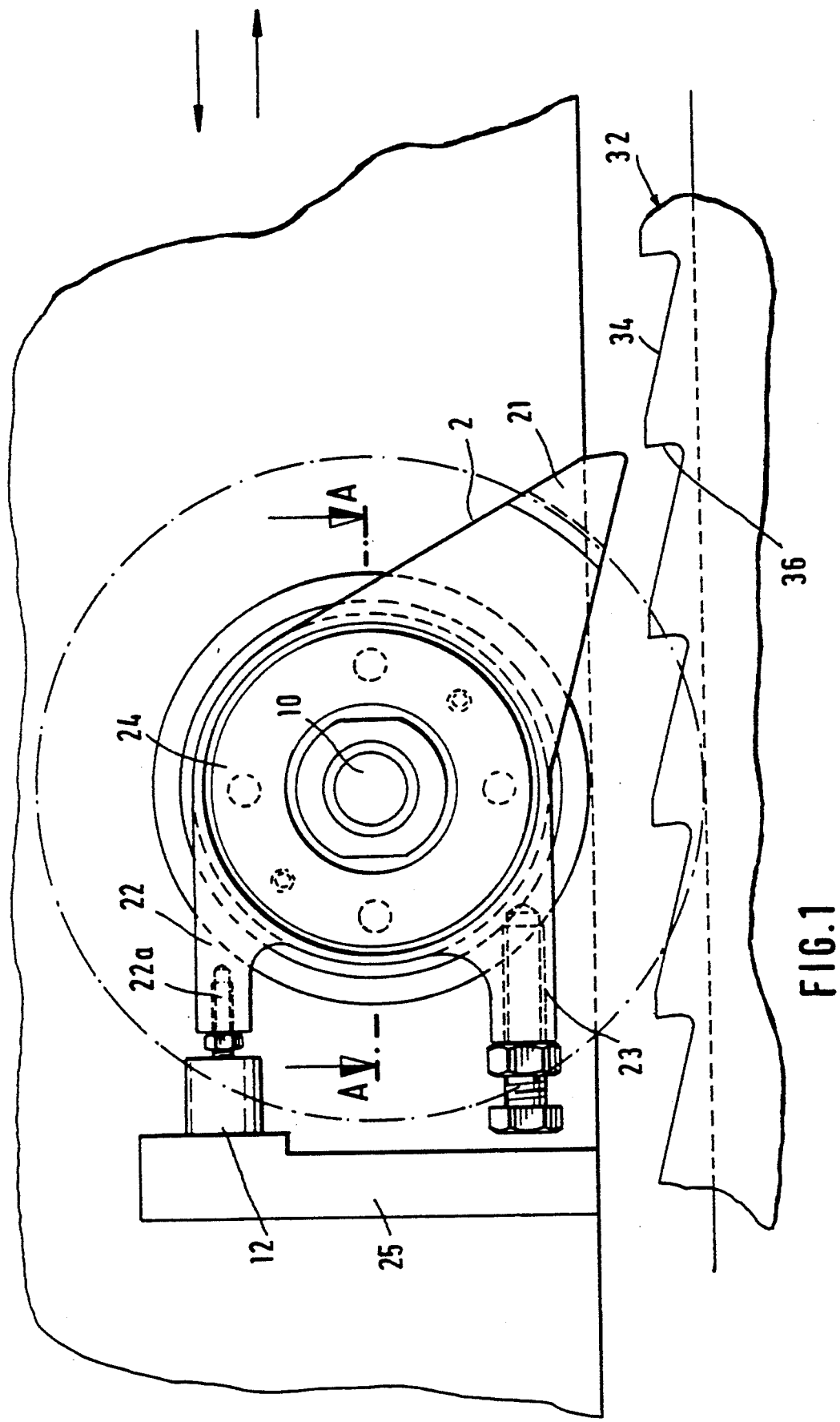
FIG. 1 is a side view of the rollback-preventing apparatus attached to the vehicle, together with a toothed rack.

As shown in FIG. 1, the rollback-preventing apparatus comprises three parts, namely, a detent pawl 2, a toothed rack 32 and a retaining member 25 attached to the vehicle. The detent pawl 2 is mounted rotatably on the axle 10 of the running wheels. It consists substantially of a disk-shaped base body 24, onto which there are molded a ratchet 21 and two approximately parallel stop arms 22 and 23. The ratchet 21 has approximately triangular shape. The tip of the ratchet 21 is formed to correspond to the toothed structure of the toothed rack 32. The ascending flank 34 of the toothed rack 32 rises gently in the travel direction. The descending flank 36 falls steeply counter to the travel direction.

The retaining member 25 is attached to the vehicle. A rubber buffer 12 is adjustably connected with a bolt 22a or with the stop arm 22.

Figure 2:
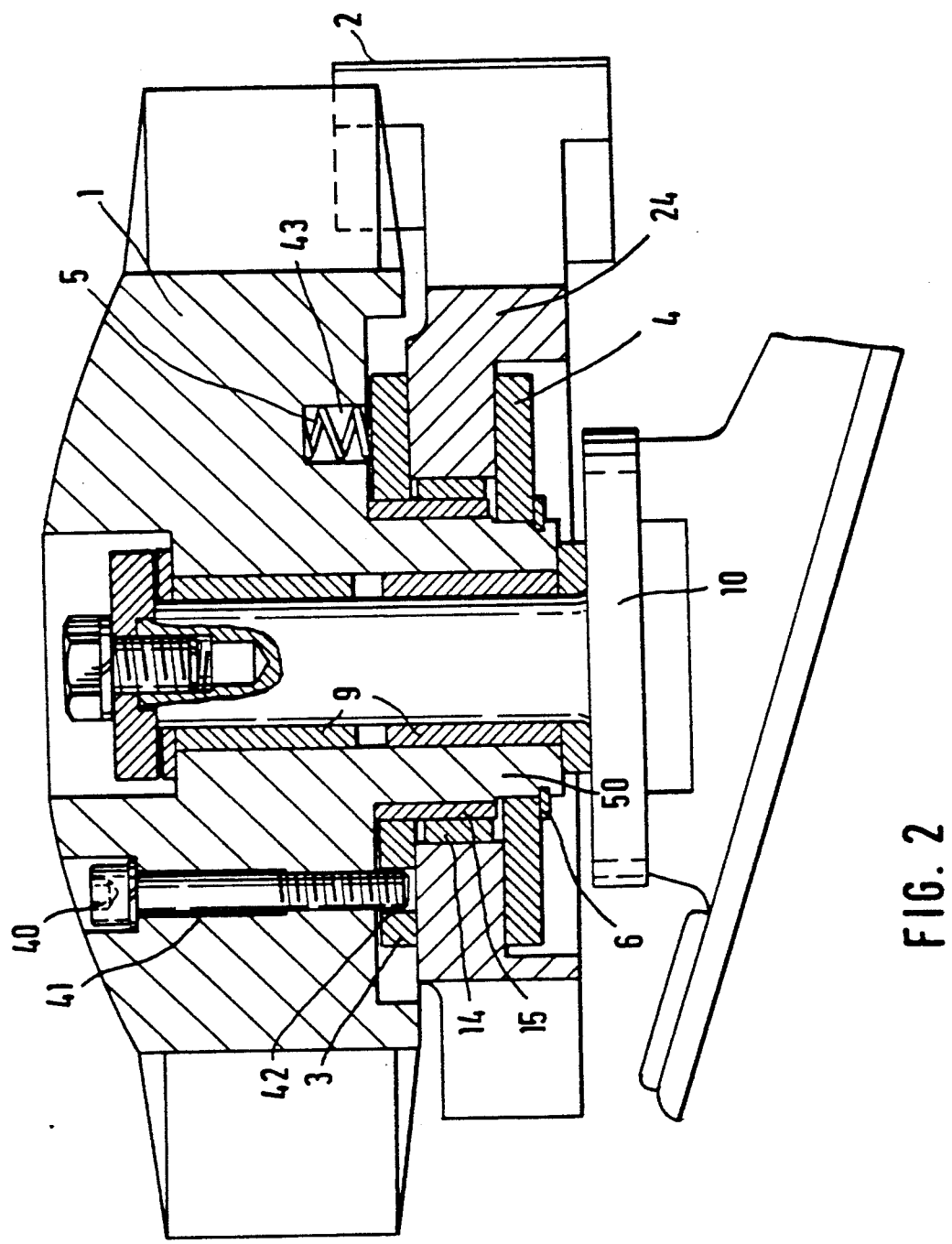
FIG. 2 is a cross-section taken along line A—A of FIG. 1.

On the axle 10 of the running wheels there is rotatably mounted the rim 1 of a running wheel, which is not shown in FIG. 2. The rim 1 has an extension 50 in the form of a hollow shaft on the side of the vehicle, which is not illustrated. On this extension 50 there is seated a ring 15, on which there is seated an inner friction disk 3 and a sliding ring 14. The friction disk 3 contains a plurality of holes 42, into each of which there projects the end of a bolt 40 driven by the rim. In addition, the rim 1 has, on the side of the vehicle, which is not illustrated, two holes 43, into each of which there are inserted compression springs 5. The detent pawl 2 is seated in axially movable condition on the sliding ring 14. At the end of the hollow-shaft-like extension 50, there is seated an outer friction disk 4, which is held by a locking ring 6. A bushing 9 is provided as the bearing of the rim.

The functioning principle of the rollback-preventing apparatus is explained below.

The inner friction disk 3 is driven by the threaded bolts attached to the rim 1. By means of the compression springs 5, the inner friction disk 3 is pushed axially by the rim 1 toward the vehicle. Thereby the friction disk 3 presses on the side face of the detent pawl 2. The opposite side face of the detent pawl 2 presses on the outer friction disk 4. The detent pawl 2 and the inner friction disk 3 are axially movable to a slight extent. The detent pawl 2 is mounted in freely rotatable condition on the axle 10 of the running wheels. The ratchet 21 is dimensioned such that the center of gravity of the detent pawl is located on the side of the ratchet 21.

Because of gravity, a force directed toward the toothed rack 32 always acts on the ratchet 21. While the vehicle is moving in the normal travel direction, the ratchet 21 is raised against the force of gravity because of the frictional engagement between the two friction disks 3 and 4 and the detent pawl 2. It is raised until the stop arm 22 with the rubber buffer 12 presses against the retaining member 25. The ratchet 21 is thereby raised just far enough that it no longer comes into contact with the toothed structure of the toothed rack 32. This avoids the generation of annoying noise. If the vehicle moves counter to the travel direction, the ratchet 21 is moved toward the toothed rack 32, on the one hand by gravity and additionally because of the frictional coupling with the friction disks 3 and 4. The ratchet 21 then engages immediately in one of the toothed structures of the toothed rack 32 and prevents the vehicle from rolling further backward.

A substantial advantage of the device is that, in the event of weakening or total failure of the frictional coupling, the ratchet 21 automatically rests on the toothed rack under the influence of gravity, and so the normal safety action is not impaired. Furthermore, the resulting noise which is produced provides a signal that the frictional force is no longer adequate. In this case, the friction disks 3 and 4 must be replaced or the spring force of the springs 5 must be adjusted.

The claims and specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

I claim:

1. Rollback-preventing apparatus for a rail vehicle for engaging a toothed rack secured to a rail track supporting the rail vehicle comprising:
   a detent pawl for mounting on a wheel of the rail vehicle, the detent pawl having a ratchet,
   means employing a function for engaging said detent pawl and a rotating part of said rail vehicle for raising said pawl out of engagement with the toothed rack during forward movement of the rail vehicle, and
   a stop for limiting the rotational movement of said detent pawl in a direction away from engagement with the toothed rack.

2. The rollback-preventing apparatus according to claim 1, wherein the center of gravity of the detent pawl is at a position to urge said ratchet downwardly to engage the toothed rack.

3. The rollback-preventing apparatus according to claim 1, wherein said stop is a resilient buffer carried by the detent pawl.

4. The rollback-preventing apparatus according to claim 1, said friction means comprising an outer friction disk and an inner friction disk in friction engagement with the detent pawl.

5. The rollback-preventing apparatus according to claim 4, and at least one spring urging the inner friction disk into engagement with the detent pawl.

6. The rollback-preventing apparatus according to claim 5, and means for connecting said inner friction disk to the wheel for rotation therewith.

7. The rollback-preventing apparatus according to claim 6, wherein said detent pawl and said friction disks have a common axis of rotation.

* * * * *